United States Patent [19]
Park

[11] Patent Number: 5,416,604
[45] Date of Patent: May 16, 1995

[54] IMAGE COMPRESSION METHOD FOR BIT-FIXATION AND THE APPARATUS THEREFOR

[75] Inventor: Goo-man Park, Seoul, Rep. of Korea

[73] Assignee: Samsung Electronics Co., Ltd., Kyungki-do, Rep. of Korea

[21] Appl. No.: 67,796

[22] Filed: May 27, 1993

[30] Foreign Application Priority Data

May 27, 1992 [KR] Rep. of Korea .................. 1992-8993

[51] Int. Cl.6 ........................................... H04N 1/415
[52] U.S. Cl. .................... 358/433; 358/426; 348/384
[58] Field of Search .................. 358/433, 261.1, 261.2, 358/261.4, 426, 432, 427, 443, 133, 135, 136; 348/384

[56] References Cited

U.S. PATENT DOCUMENTS

| | | | |
|---|---|---|---|
| 5,021,891 | 6/1991 | Lee | 358/433 |
| 5,065,447 | 11/1991 | Barnsley et al. | 382/56 |
| 5,146,324 | 9/1992 | Miller et al. | 358/133 |
| 5,231,484 | 7/1993 | Gonzales et al. | 358/133 |

*Primary Examiner*—Edward L. Coles, Sr.
*Assistant Examiner*—Madeleine A. V. Nguyen
*Attorney, Agent, or Firm*—Sughrue, Mion, Zinn, Macpeak & Seas

[57] ABSTRACT

An image compression and expansion methods for bit-rate fixation and the apparatus therefor in a video image apparatus which compresses the input image signal by performing a discrete cosine transform operation, quantizing, and variable-length-encoding the original image for each block respectively in order to enhance the compression efficiency. Thus, the number of bits can be effectively fixed by placing inter-screen differential distortions and periodically varying in a preset period the positions of distortions when variable-length-encoding the respective pictures of the successive pictures with respect to a still image.

17 Claims, 5 Drawing Sheets

IMAGE COMPRESSION METHOD FOR BIT-FIXATION AND THE APPARATUS THEREFOR

BACKGROUND OF THE INVENTION

The present invention relates to image compression and decompression methods for bit-rate fixation and an apparatus therefor in image apparatuses, and more particularly to image compression and decompression methods and the apparatus therefor for effectively fixing the amount of bits by placing inter-screen differential distortions and periodically varying at a predetermined period the position of distortions when independently processing and encoding the respective pictures of the successive images with respect to a still image by a still image compression method. The present disclosure is based on the disclosure of Korean Patent Application No. 92-8993 filed May 27, 1992, which disclosure is incorporated herein by reference.

In the field of digital signal processing, i.e. in processing the image signal of a digital video cassette recorder (digital VCR), a high definition television (HDTV), digital video cameras, video phones or the like into the form of digital data, a technique has been used to compress the amount of image information. Especially, various compression encoding methods have been suggested, which enhance the recording efficiency of recording media used in digital VCRs.

The fixed amount of compressed digital data is, unlike that of the analog signal, not directly proportional to the fixed size of an original image. Therefore, the amount of compressed data has to be controlled so as to be equal for each field or a fixed-size frame, because fixing the amount of output bits is very important when performing trick-play such as a high speed playback.

In other words, to perform a special reproduction such as a high speed searching, screens of the compressed image data should have equal sizes, and the data on a particular section of the tape should correspond to the position where the screen of an image was originally positioned. However, complicated portions of an image screen consume a large quantity of bits in the encoding process, while simpler parts require fewer bits.

Accordingly, when it is necessary to encode and record the image signal corresponding to a screen or a segment within a track of a magnetic tape having a finite length in conventional digital VCRs, the amount of encoded bits exceeding one track results in a variable length encoding method for recording the excess encoded bits onto the next following track, or a fixed length encoding method for stopping the encoding of the remaining parts if the number of encoded bits reaches the preset number of bits. Until recently, conventional digital VCRs have employed one or the other of these two methods.

The aforementioned variable length encoding method encodes linearly quantized coefficients by allocating thereto a variable-length code. However, as the number of encoded bits is not fixed, unless the recording format of a recording medium is properly controlled, the bit streams would influence one another, so that the operations of editing and high speed reproduction would be apt to generate many errors.

On the other hand, the above fixed length encoding method encodes the quantization coefficients resulted from an adaptive quantization, by allocating thereto a fixed-length code. Here, the bit streams have no mutual influences on each other, which reduces error probability in reproduction. In this case, however, the limited amount of recorded information degrades the picture quality.

The data compression apparatus and the method thereof for maintaining equally the amount of compressed data by means of the variable length encoding method is disclosed in U.S. application Ser. No. 07/886,194 filed May 21, 1992 which has been applied for by the same applicant and which is incorporated herein by reference.

Actually, in the entropy encoding process of the above-described image compression apparatuses, errors between the expected consumption number of bits and the required number of bits are caused. In such cases, a certain part of the DCT coefficients is removed and the amount of bits is controlled to a fixed amount. However, discrete cosine transform (DCT) coefficients are compulsively eliminated so that the image quality may become unbalanced with those of neighboring blocks, which generates an inconsistent picture quality. In other words, in the process of eliminating the DCT coefficients, a tolerance distortion bound is set, and if the consumed amount of bits exceeds the tolerance distortion bound, the DCT coefficients would be removed in excess of this bound, which degrades the picture quality. Therefore, the coefficients should be removed within the tolerance distortion bound, to be entropy-encoded as such.

Accordingly, the DCT coefficients are removed within the tolerance distortion bound in the divided blocks of one picture screen. At this point, one screen (one frame or a predetermined number of fields) of the image should be compressed into an equal size so that the particular section's data on a tape may correspond to that of the original image screen. If more DCT coefficients are removed in latter sections of a screen as much as the exceeded amount of bits, the errors are getting larger between the expected amount of bits and those actually consumed in the latter half of a screen. Consequently, the distortion in the latter half of the screen is more severe than in the former half, which in turn degrades the picture quality.

SUMMARY OF THE INVENTION

To overcome above-described problems, the object of the present invention is to provide an image compression method and the apparatus therefor for effectively fixing the amount of bits by placing inter-screen differential distortions in a preset number of screen periods and thereby repeatedly varying the distortion positions when variable-length-encoding the input image.

Another object of the present invention is to provide an image compression method and the apparatus therefor for effectively fixing the amount of bits by varying the quantization step-size and the tolerance distortion bound in regard to the distortion domain, the position of the distortion domain being repeatedly varied with the inter-screen differential distortions when variable-length-encoding pictures of an image signal successive to a still image.

Further another object of the present invention is to provide an image decompression method and the apparatus therefor for reconstructing the compressed image into the original image signal, the image data having been compressed by fixing the amount of bits by placing the inter-screen differential distortions in a preset number of screen periods and thereby repeatedly varying the position of distortions when variable-length-encoding the input image signal.

To accomplish the above objects, the image compression method according to the present invention relates to an image compression encoding method for performing DCT, quantizing and variable-length-encoding the original image on a block-by-block basis in order to enhance the recording efficiency by compressing the input image signal. The method comprises a distortion domain setting step for setting the specific sub-image domain (distortion domain) having differentially set distortions therein for each screen in a preset number of screen periods; and a step for quantizing the currently input block's image signal by varying the quantization step-size, if the currently input block comes under the predetermined distortion domain, and allocating the number of bits for a screen by varying the tolerance distortion bound in regard to the number of bits of the quantized coefficients, thereby converging the actually consumed number of bits in a screen with the desirable number of bits.

Moreover, the image compression apparatus according to the present invention comprises separating means for separating the luminance and color difference signals from the input digital image signal and then dividing them into a predetermined block-size; detecting means for detecting the activity of the luminance and color difference signals separated from the separating means and classifying the signals into the corresponding classes according to the detected activity; transforming means for outputting the transform coefficients obtained by performing DCT with respect to the output signal from the separating means on a block-by-block basis; distortion-domain setting means for differently setting the distortion domain having a distortion value larger than a reference tolerance distortion bound for each screen respectively in the preset number of screen periods and controlling the sequence of blocks to be read by the separating means; scale factor controlling means for setting the scale factor corresponding to the mean activity of the overall image from the separating means and varying the scale factor for the distortion domain set by the distortion-domain setting means; quantizing means for generating the quantization coefficients by quantizing the transform coefficients in accordance with the quantization step-size determined by multiplying the quantization matrix by the scale factor output from the scale factor controlling means; variable-length-encoding means for variable-length-encoding the quantization coefficients output from the quantizing means; and bit-allocating means for controlling the number of bits of the quantized coefficients output from the quantizing means by the reference number of bits correspondingly allocated in accordance with the activity, and controlling the tolerance number of bits by varying the reference tolerance distortion bound for the blocks of distortion domain.

BRIEF DESCRIPTION OF THE DRAWINGS

These and other objects, features, aspects and advantages of the present invention will become more apparent from the following detailed description of the present invention when taken in conjunction with the accompanying drawings, in which.

DETAILED DESCRIPTION OF THE PREFERRED EMBODIMENT

Figure 1:
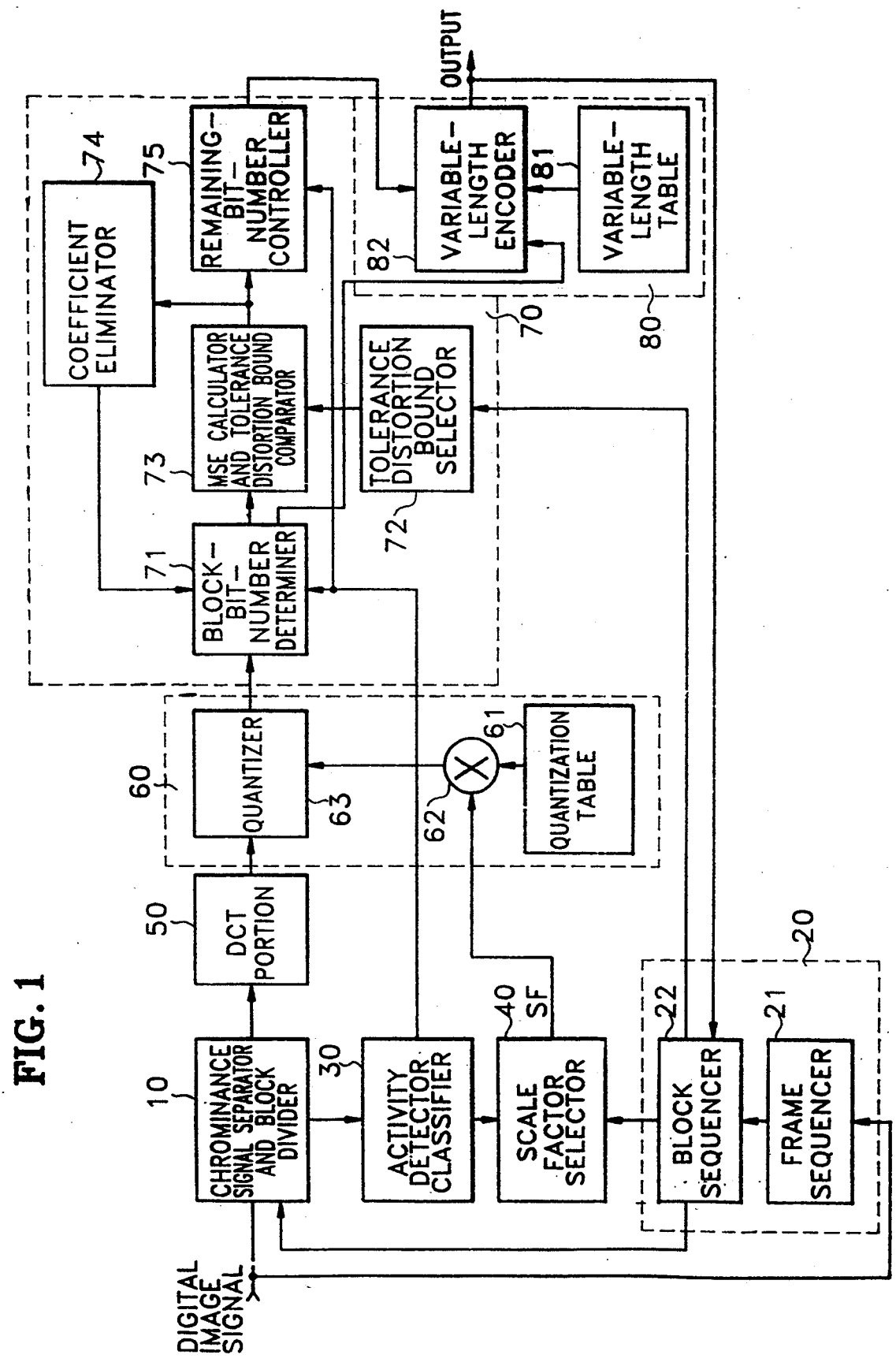
FIG. 1 shows a block diagram of the image compression apparatus for bit-rate fixation in accordance with the present invention.
Figure 2A:
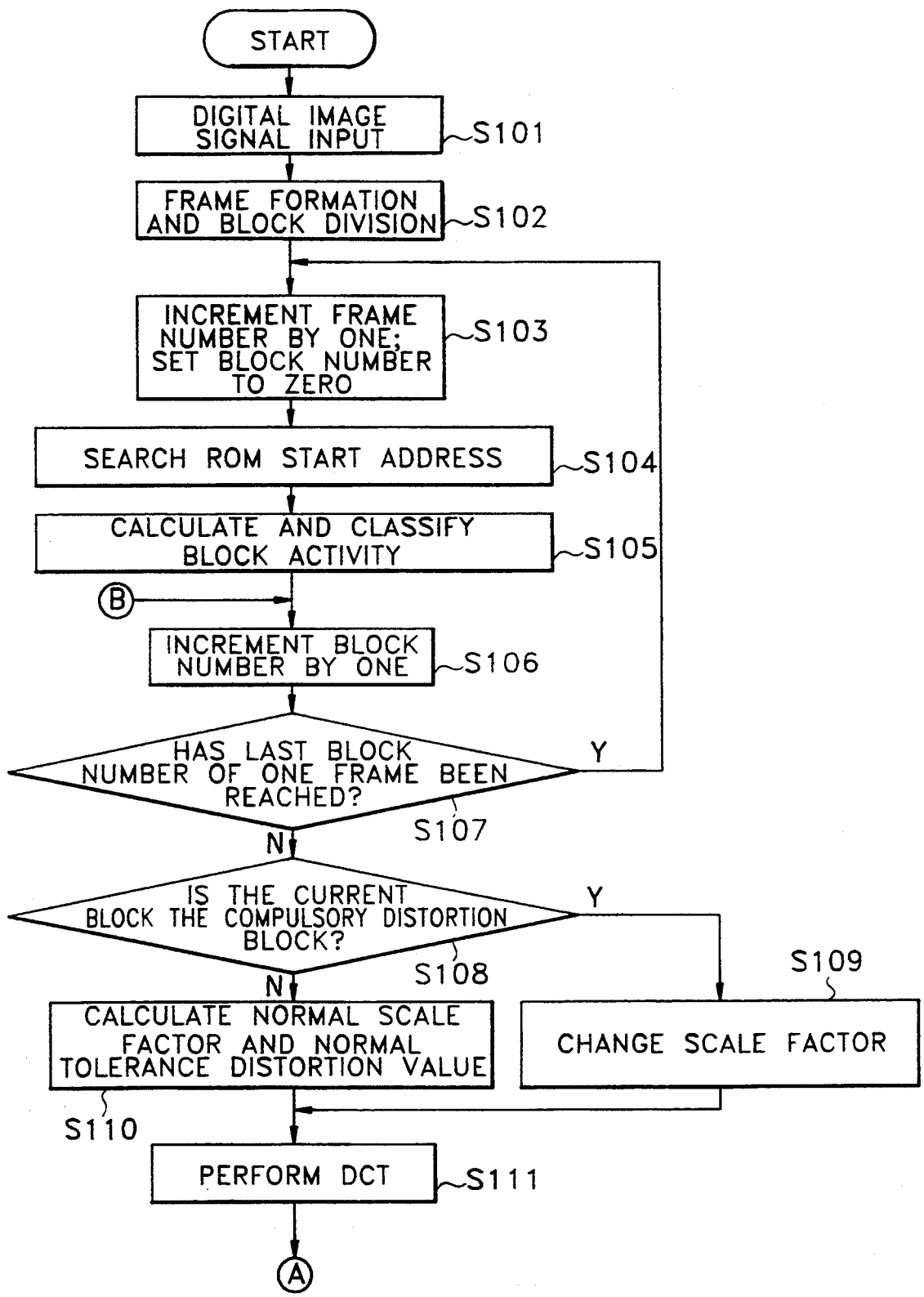
FIGS. 2A and 2B are flowcharts showing the image compression method for bit-rate fixation in accordance with the present invention.
Figure 2B:
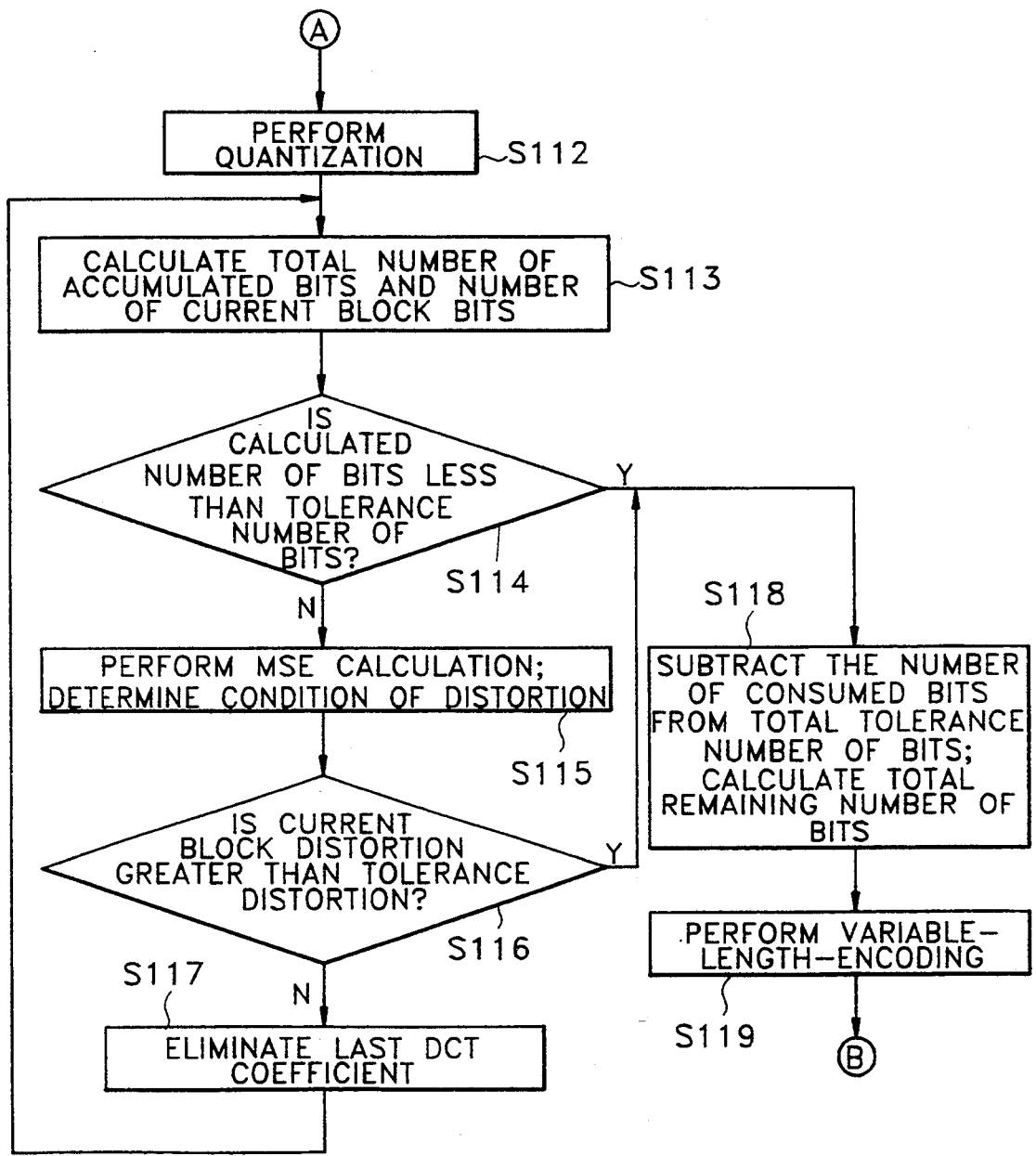

Hereinafter, a preferred embodiment of the data compression and decompression methods and the apparatus therefor for bit-rate fixation in accordance with the present invention will be explained with reference to the attached drawings.

The present invention adopts a variable-length-encoding method using a DCT technique used in JPEG algorithm, and uses a forward control (which includes blocks 10, 20, 30, 40, and 60 in FIG. 1) for calculating the directional ability of a DCT block for bit-rate fixation and then increasing the removal rate of non-representative directional components' coefficients so as to vary the quantization stepsize for each coefficient, a backward control (which includes blocks 75 and 80 in FIG. 1) for constantly maintaining the rate condition of a buffer by decreasing the amount of data by changing the quantization step-size of the quantizer if the rate buffer becomes full excessively, not in a constant rate, the rate buffer having been used in the rear end of the International Standardization Moving Picture Experts Group (MPEG-1, MPEG-2) processed in ISO (international Organization for standardization), and a differential distortion allowance control (which includes blocks 71, 72, 73, and 74 in FIG. 1) for controlling the quantization stepsize by placing differential distortions for each domain of a screen, the distortion using a human visual system considering the shape and position which are not felt spoiled greatly to the human vision.

The overall sequential flow of the image compression and decompression methods for a fixed bit-rate according to the present invention is as follows.

(1) Chrominance signal separation: Luminance signal Y and color difference signals R-Y and B-Y are separated from the RGB signal.

(2) Differential distortion domain setting: The distortion pattern of which the tolerance distortion bounds are set to be larger than in other domain for each screen, in consideration of the shape and domain imperceptible to the human visual system, is set differently for each screen.

(3) Activity calculation and class classification: The activity meaning complexibility and directionality of three separated component signals is calculated. Higher activity leads to a larger amount of bits to be allocated, and the allocated number of bits for each block is calculated from the total number of bits limited by the relative ratio of the specific block's activity to the total activity. Calculating the activity gives birth to classifying the blocks into a preset number of classes according to the entropy and directionality of blocks by using the representative directionality for each block and variance of blocks.

(4) Scale factor selecting: Initial scale factor (normal scale factor) is given to perform quantization in accordance with the mean activity of the overall image, and the initial scale factor is changed in the distortion domain.

(5) Block-processing sequence: Images of the respective components are DCT-processed on a block-byblock basis in the sequence of first the normal domain and then the distortion domain set by the distortion pattern. Priority is given to the normal domain in a screen.

(6) Quantization for each class: Among the obtained DCT coefficients, non-representative directional components' coefficients of the class the block belonging thereto are getting easier to be removed. The less-important coefficients are properly removed, and then each coefficient becomes integer by variable-quantization according to the quantization table.

(7) Controlling number of block bits: The required number of bits is calculated before encoding. If the calculated number of bits is larger than the allocated number of bits, the non-zero coefficient in the rearward-most position of the coefficient array is made to "0" and then the number of bits is recalculated. Until the number of bits reaches the allocated number of bits, the non-zero coefficients are getting removed repeatedly. Accordingly, the mean square error of block increases, thus if the mean square error exceeds the reference mean square error (referred as reference tolerance distortion bound) given differently for each class, the coefficient removal is interrupted, and the tolerance distortion bound for distortion domain is selected larger than the reference tolerance distortion value given differently for said classes.

(8) Controlling total number of bits: If the calculated number of bits is smaller than the tolerance number of bits for a block, the number of bits consumed up to the current block is subtracted from the total tolerance number of bits, and the total number of bits to be allocated to the remaining screen domain is controlled.

(9) Entropy-encoding: The quantized coefficients are entropy-encoded as in the Huffman code by being arrayed in a zigzag form. DC components goes through one-dimensional DPCM (differential-pulse-code modulation), and the expected value of error between the preceding block's DC value and the current block's DC value is encoded. AC components are encoded in accordance with a probability value considering the magnitude of both the zero run and succeeding non-zero coefficients.

(10) Decoding process: From the Huffman code, real values are reproduced with respect to the coded data and arrayed in an inverse-zigzag array to a two-dimensional array. The inverse quantization is performed with the scale factor having been used in encoding, and by the inverse discrete cosine transform (IDCT) the blocks are re-arrayed correspondingly to the positions thereof in the original screen to get the reproduced component signal. The RGB signal is then reconstructed through a transformation of the chrominance signal.

Next, the image compression and decompression methods for a fixed bit-rate and the apparatus therefor in accordance with the present invention will be explained in detail.

FIG. 1 is a block diagram showing an embodiment of the image compression apparatus for bit-rate fixation according to the present invention.

According to FIG. 1, the image compression apparatus for a fixed bit-rate in accordance with the present invention comprises chrominance signal separator and block divider 10 for separating the input image signal into luminance signal Y and color difference signals R-Y and B-Y and dividing the block into parts of a preset size, differential distortion domain setter 20 for differently setting the distortion patterns for each screen, having a larger tolerance distortion bound than other domains by a preset frame period, in consideration of the shape and domain imperceptible to the human visual system, activity detector and class classifier 30 for detecting the activity of the luminance and color difference signals from chrominance signal separator and block divider 10 and then classifying the signals into corresponding classes in accordance with the detected activity, scale factor selector 40 for calculating the initial scale factor corresponding to the classified class and selecting the scale factor of the block corresponding to the distortion domain set by differential distortion domain setter 20 so as to be larger than the initial scale factor, DCT portion 50 for performing a DCT operation for the image signal output in an encoding unit (block unit) from chrominance signal separator and block divider 10, quantizing portion 60 for quantizing the DCT coefficients, bit allocator 70 for controlling the number of bits of a quantized coefficient by the reference of the number of bits allocated correspondingly to the detected activity, thereby controlling the tolerance number of bits by varying the reference tolerance distortion bound for the block of distortion domain set by differential distortion domain setter 20, and entropy-encoder 80 for variable-length-encoding the output from bit allocator 70.

At this point, differential distortion domain setter 20 comprises frame sequencer 21 for recognizing the order of the frame of a currently input digital image signal in the distortion pattern frames, thereby outputting the corresponding control signal, and block sequencer 22 having a ROM (not shown in the drawings) for storing the distortion patterns about the distortion shape and position of a screen by means of the human visual system in a period having preset number of frames.

Quantizing portion 60 comprises a quantization table 61, a multiplier 62 for multiplying the output of scale factor selector 40 by the output of quantization table 61, and a quantizer 63 for quantizing the DCT data output from DCT portion 50 by the quantization step-size provided by multiplier 62.

Bit allocator 70 comprises a block-bit-number determiner 71 for counting the number of bits of quantized coefficient output from quantizer 63 and then comparing it with the allocated number of bits set according to the activity for each block by activity detector and class classifier 30, a tolerance distortion bound selector 72 for selecting the reference tolerance distortion bound for the classes, respectively, which are classified by activity detector and class classifier 30 and then varying the reference tolerance distortion bound of the distortion domain, a Mean Square Error (MSE) calculator and tolerance distortion bound comparator 73 for calculating the MSE of the number of currently input quantization bits if the number of currently quantized bits is larger than the allocated number of bits and then comparing it with the tolerance distortion bound selected by tolerance distortion bound selector 72, a coefficient eliminator 74 for reducing the number of bits of the output from MSE calculator and tolerance distortion bound comparator 73 if the number of quantized bits is larger than the allocated number of bits, and a remaining-bit-number controller 75 for calculating the total number of bits (number of remaining bits) to be allocated to the rest of the blocks upon completion of the encoding of a block.

Entropy-encoder 80 comprises a variable-length table 81 consisting of the Huffman code table, and a variable-length encoder 82 for encoding the quantization coefficient output via remaining-bit-number controller 75, using variable length table 81.

Now, the operation of FIG. 1 will be described with reference to FIGS. 2 through 5. The operations of chrominance signal separator and block divider 10, scale factor selector 40, quantizing portion 60, DCT portion 50, and entropy encoder 80, and activity detector and class classifier 30 are conventional so that their detailed explanation will be omitted.

Chrominance signal separator and block divider 10 receives the digital image signal input from a signal input source (not illustrated), separates luminance signal Y and color difference signals R-Y and B-Y therefrom, sub-samples thus separated color difference signals, and thereafter divides the signals into a preset block-size units, i.e., 8-by-8 blocks (steps S101 and S102).

Frame sequencer 21 of distortion domain setter 20 recognizes the order of the frame of the currently input digital image signal in the distortion pattern frames, and accesses to the ROM of block sequencer 22 wherein the distortion patterns are stored (step S103).

Explaining this in more detail, according to the signal determining the order of currently frame output from frame sequencer 21 in the preset screen's distortion patterns, the corresponding ROM is accessed among a plurality of ROMs wherein the screen's distortion patterns are stored. The ROM has the block positioning data corresponding to the block reading sequence, i.e., the priority given to the normal domain, of chrominance signal separator and block divider 10. If the block being read by chrominance signal separator and block divider 10 comes under the distortion domain, the signal for controlling the scale factor to be varied is output to scale factor selector 40, and simultaneously, a control signal for varying the tolerance distortion bound is output to tolerance distortion bound selector 72 of bit allocator 70.

Figure 3:
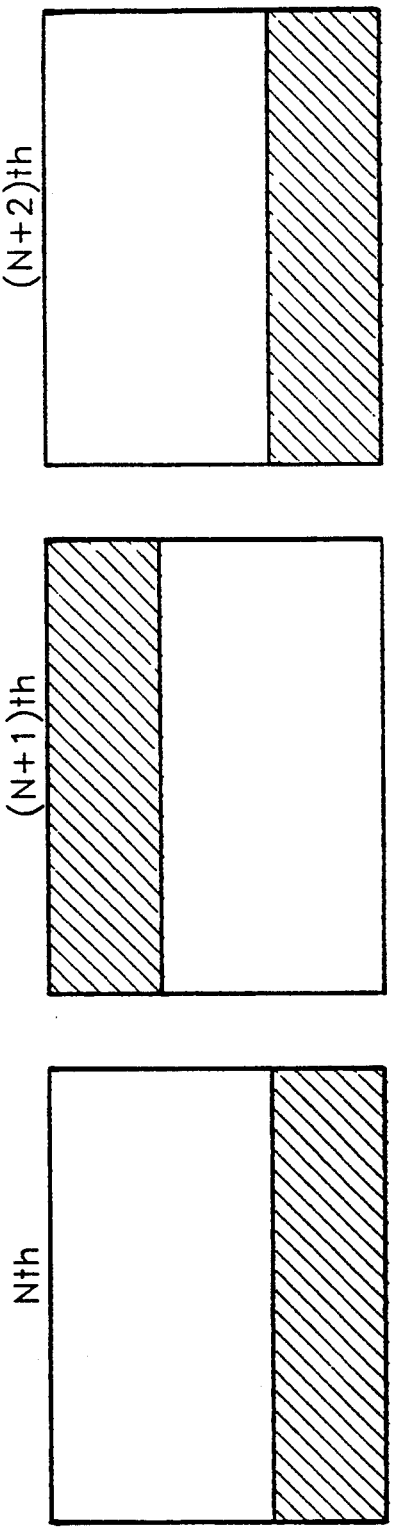
FIGS. 3 to 5 are diagrams showing the distortion patterns set by the differential distortion domain setting means shown in FIG. 1.

Here, explaining the distortion pattern stored in the ROM of block sequencer 22, as shown in FIG.3, the information about the blocks is stored in ROM so that Nth and (N−1)th screens should have different distortion patterns having their most extreme distortions in different domains (upper or lower section) respectively. That is, relatively speaking, a lower section of the Nth screen (or field) has lower picture quality in general, and an upper section of the (N+1)th screen has more distortion. And, the lower section of the (N+2)th screen has more distortion.

Figure 4:
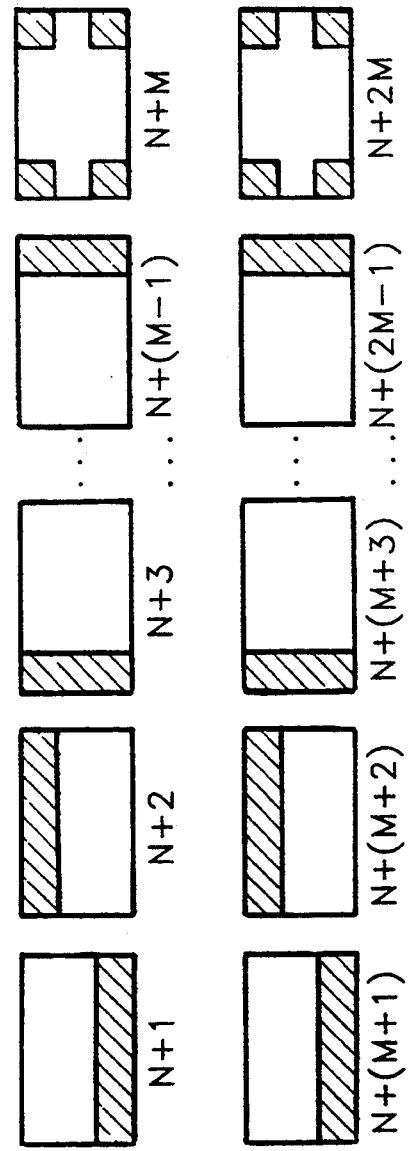

Additionally, according to FIG. 4, instead of placing bigger distortions only in the upper and lower sections of the screen as shown in FIG. 3, the distortions can be given by turns on the various positions in the screen by a period M, i.e., for every N+1, N+2, N+3, ..., and N+Mth screen, thereby increasing the repeating period of the distortions.

Figure 5:
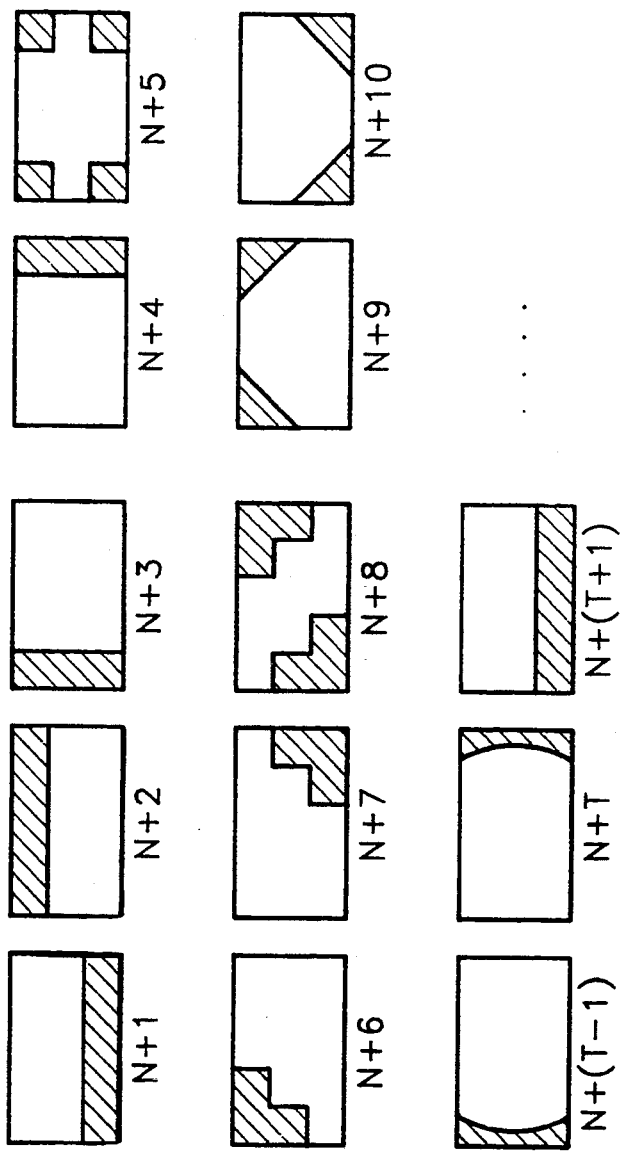

According to FIG. 5, the distortions are shown in the same positions repeatedly by the period T. However, the space frequency band signal having a susceptible sensitivity to human vision is completely encoded and the other band signals are limitedly encoded with less information than is necessary for image expression. Thus, the human visual system is utilized for sufficiently encoding with a limited amount of information, and the distortion is given as in the shape and domain which is imperceptible to the human visual system.

In summary, according to the control signal, which helps access the ROM corresponding to the distortion pattern of the current frame, given by frame sequencer 21, block sequencer 22 searches the ROM starting address wherein the distortion pattern of the current frame is stored (step S104).

Activity detector and class classifier 30 calculates the activity, which means the complexibility and directionality of the blocks divided into preset block size with respect to Y or R-Y and B-Y output from chrominance signal separator and block divider 10. Block activity is defined as the square root of the sum of square of four directional activities (horizontal, vertical, and the two opposing diagonal directions). The activity is directly proportional to the number of bits, such that a higher activity leads to a larger number of bits. Here, the expected number of bits (or allocated number of bits) for a block is determined according to the activity value.

In other words, the allocated number of bits can be calculated from the total number of bits limited by the relative ratio of the activity of a preset block size (reference block) to the sum of all activities. The thus-calculated allocated number of bits is provided to block-bit-number determiner 71 and remaining-bit-number controller 75. Moreover, the mean activity resulted from dividing the activity summation by the total number of bits of the reference block bears an influence on the establishment of the scale factor.

Next, classifications are made by considering the representative directionality and variance of each block. That is, classes are determined using the information about the entropy and the directionality for respective blocks. The variance (VAR) necessary for such classification can be expressed as $$VAR = \frac{1}{N^2} \sum_{i=0}^{N-1} \sum_{j=0}^{N-1} |f(i,j) - \bar{f}|^2 \qquad (1)$$

wherein, f is a mean value of block image elements.

Classes are classified in a sequence of smallest activities with respect to four directional activities, and four directional activities in a sequence starting from the smallest value correspond to $MIN_1$, $MIN_2$, $MIN_3$, $MIN_4$ respectively, and the classes are classified in accordance with the activity, $MIN_i$ (i=1, 2, 3, and 4) value, and the variance (step S105).

Scale factor selector 40 determines an initial scale factor SF, which is a quantization parameter to quantize, according to the mean activity obtained from activity detector and class classifier 30, and, if the block to be quantized comes under the distortion domain, enlarges the scale factor by adding a predetermined value of change (ΔSF) to the scale factor in accordance with distortion block control signal output from block sequencer 22 (steps S106–S110).

DCT portion 50 performs a DCT operation to the block image data having been separated by chrominance signal separator and block divider 10 following the reading sequence in accordance with the block reading sequence control signal output from block sequencer 22 (step S111).

Quantizer 63 controls the quantization step-size in accordance with the output of multiplier 62 which multiplies the quantization matrix of quantization table 61 by the scale factor set for respective classes. Each DCT coefficient has different visual importance for its position, so the matrix element values (quantization step-size) consisting of variable values for the respective positions are applied. Therefore, if a quantization matrix is $QM_{(U,V)}$, the quantization step-size $Q_{(U,V)}$ for each DCT coefficient is determined by $$Q_{(U,V)} = SF \times QM_{(U,V)} \quad (2)$$

The present invention performs a variable quantization for DCT coefficients. That is, the removing rate of the coefficients of non-representative directional components of a block is increased so that the coefficients may be controlled to have different quantization step-sizes.

After completion of the coefficient attenuating operation for each class, the quantization due to the quantization step-size is executed (step S112). Here, quantization table 61 makes use of a quantization matrix suggested by the ISO/CCITT.

Bit allocator 70 controls the number of bits for each block to be accurate by loading the allocated number of bits for a block in advance following the activity of the block, and comparing it with the quantization coefficient (step S113). First, the allocated number of bits for a block is given by activity detector and class classifier 30, and the initial total number of bits of a block is calculated. The initial total number of bits is the sum of all activities A(m) for all blocks, and expressed $$TA(0) = \sum_{m=0}^{n} A(m) \quad (3)$$

wherein n is the total number of blocks of a screen. The initial total number of bits TB(0) according to the required bit-rate is $$TB(0) = N \quad (4)$$

wherein N is the total number of bits of a screen. Accordingly, the allocated number of bits B(m) of the mth block is expressed:

$$B(m) = \frac{TB(m) \cdot A(m)}{TA(m)} \quad (5)$$

Hence, allocated number of bits B(0) of the first block becomes a tolerance number of bits for each block. Accordingly, if the current number of bits of the coefficients having been quantized by quantizer 63 is not larger than tolerance number of bits B(m), the current number of bits is output to entropy-encoder 80. But, if the current number of bits is larger than tolerance number of bits B(m), before being sent to variable length encoder 82 the coefficient is made to have the number of bits thereof repeatedly decreased to the tolerance number of bits while not exceeding the MSE value admitted for each class. That is, allocated number of bits B(m) from block-bit-number determiner 71 is compared with the quantization coefficient, and if the number of quantization bits is larger, the MSE value is calculated using the following equation and a control signal is output from coefficient eliminator 74 in order to eliminate the last coefficient of DCT coefficients.

MSE (Mean square error) is defined as $$MSE = \frac{1}{4} \sum_{U=0}^{N-1} \sum_{V=0}^{N-1} |F_{(U,V)} - C_{(U,V)}|^2 \quad (6)$$

wherein $F_{(U,V)}$ is a coefficient resulted after the DCT operation, and $C_{(U,V)}$ is a quantized coefficient.

The MSE value increases as the non-zero coefficients are repeatedly eliminated until the calculated number of bits reaches the allocated number of bits, so if the calculated number of bits exceeds the specific MSE value differently given as the reference value for each class, coefficient eliminator 74 finishes the coefficient eliminating process and outputs the quantization coefficient to variable length encoder 82 (steps S114–S117).

On the other hand, when the calculated number of bits is smaller than or equal to the tolerance number of bits, remaining-bit-number controller 75 subtracts the consumed number of bits up to the current block from the total tolerance number of bits and calculates the total number of remained bits which can be used for the rest of screen domains.

That is, if the current block's number of bits is B(m), the total number of bits is defined as $$TB(m+1) = TB(m) - B(m) \quad (7)$$

and likewise, the total activity TA(m+1) allowable in the following block is $$TA(m+1) = TA(m) - A(m) \quad (8)$$

wherein, A(m) is an activity of the current block. Therefore, the (m+1)th block's allocated number of bits is expressed:

$$B(m+1) = \frac{TA(m+1) \cdot A(m+1)}{TA(m)} \quad (9)$$

Variable length encoder 82 encodes the quantization coefficients of each block to be transferred or stored therein. At this time, relating the encoding method, DC components goes through one-dimensional DPCM, and the expected value of error between the preceding block's DC value and that of the current block is encoded. AC components are encoded by means of Huffman code table 81 according to the generation probability considering the magnitude of both of the zero run and succeeding non-zero coefficients. If end-of-block (EOB) signal is loaded at the starting position of a zero run, a control signal signifying the completion of block encoding is output to block sequencer 22 and the encoding process is repeated (steps S118 and S119).

Here, if the number of bits to be actually consumed in the overall screen is smaller than or equal to the tolerance amount of bits, the inter-screen differential distortion according to the present invention is unnecessary.

Especially, the present invention can be used in the image compression apparatuses of digital VCRs and HDTVs, and in any coder/decoder for use in connection with moving pictures.

As described above, the image compression and decompression methods for bit-rate fixation and the apparatus therefor according to the present invention fix the number of bits by placing the inter-screen differential distortions and periodically varying the position of distortions while variable-length-encoding the successive screens with respect to the still image. Thus, the number of bits can be effectively fixed so that the image quality can be stabilized and hardware realization becomes easier.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In an image compression encoding method for bit-rate fixation by performing discrete cosine transform operations and quantizing and variable-length-encoding an original image on a block-by-block basis in order to enhance compression efficiency by compressing an input image signal, the image compression method comprising:

a distortion domain setting step for differently setting a specific sub-image domain (distortion domain) having a differentially set distortion therein for each of a plurality of screens in a preset number of screen periods; and a convergence step for quantizing a currently input block's image signal by varying the quantization step-size, if the currently input block comes under a predetermined distortion domain, and allocating a number of bits for a screen by varying a tolerance distortion bound in regard to a number of bits of quantized coefficients, thereby converging an actually consumed number of bits in a screen with a desirable number of bits.

2. An image compression method for bit-rate fixation as claimed in claim 1, wherein said convergence step converges the number of bits to a tolerance number of bits by repeatedly increasing the tolerance distortion bound and scale factor of the distortion domain by a preset number of screens.

3. An image compression method for bit-rate fixation as claimed in claim 1, wherein said distortion domain setting step sets distortion patterns based on a shape and domain imperceptible to a human visual system in a screen.

4. An image compression method for bit-rate fixation as claimed in claim 3, wherein said distortion domain setting step includes:

a setting step for setting the distortion patterns of the screen in a preset number of frame periods;

a distortion pattern recognizing step for recognizing the order of the frame of a currently input digital image signal in distortion pattern frames; and a searching step for accessing to the distortion pattern corresponding to a recognized distortion pattern of a screen.

5. An image compression method for bit-rate fixation as claimed in claim 4, wherein said setting step sets the distortion domain following the quantization sequence in order to first quantize a normal domain based on a distortion domain.

6. An image compression method for bit-rate fixation comprising:

a separating step for separating luminance and color difference signals from an input digital image signal and outputting them in a preset-size of blocks having been divided into a preset number of blocks;

a detecting step for detecting an activity of the luminance and color difference signals having being separated from said separating step, and classifying said image signal into the corresponding class according to the detected activity;

a transforming step for outputting transform coefficients obtained by performing a discrete cosine transform operation for the output data from said separating step on a block-by-block basis;

a distortion domain setting step for differently setting the distortion domains having a large distortion therein for each of a plurality of screens respectively by a preset screen period, and controlling a sequence of blocks to be read by said separating step;

a scale factor controlling step for setting a scale factor corresponding to a mean activity of the overall image in said separating step, and varying the scale factor if the block, read by said separating step, comes under the distortion domain set by said distortion domain setting step;

a quantizing step for outputting quantization coefficients by quantizing said transform coefficients in accordance with quantization step-sizes determined by multiplying a quantization matrix by the scale factor output from said scale factor controlling step;

a variable-length-encoding step for variable-length-encoding the quantization coefficients output from said quantizing step; and a bit allocating step for controlling the number of bits of the quantized block output from said quantizing step on a block-by-block basis according to a reference number of bits correspondingly allocated in accordance with the activity, and controlling a tolerance number of bits by varying a reference tolerance distortion value for blocks of distortion domain.

7. An image compression method for bit-rate fixation as claimed in claim 6, wherein said distortion domain setting step sets the distortion patterns based on a shape and domain imperceptible to human vision in a screen according to a human visual system.

8. An image compression method for bit-rate fixation as claimed in claim 7, wherein the distortion domain setting step comprises:

a setting step for setting the distortion pattern of a screen in the preset number of frame periods;

a distortion pattern recognizing step for recognizing an order of an frame of a currently input digital image signal in the distortion pattern frames; and a searching step for accessing to said setting step the distortion pattern corresponding to a recognized screen is stored therein.

9. An image compression method for bit-rate fixation as claimed in claim 8, wherein said distortion domain setting step sets the distortion domain following a quantization sequence in order to first quantize a normal domain based on the distortion pattern.

10. An image compression method for bit-rate fixation as claimed in claim 6, wherein said bit allocating step comprises:

a block-bit-number determining step for counting the number of bits of quantized coefficient output from said quantizing step and comparing it with an allocated number of bits set based on the activity of each block;

a tolerance distortion bound selecting step for selecting the reference tolerance distortion bound according to a class detected at said detecting step and varying a reference tolerance distortion bound in a distortion domain set by said distortion domain setting step;

mean square error calculating and tolerance distortion bound comparing step for calculating a mean square error of a number of currently input quantization bits if the number of currently quantized bits is larger than an allocated number of bits, and then comparing a calculated mean square error with a tolerance distortion bound set by tolerance distortion bound selecting step;

a coefficient eliminating step for reducing the number of bits from a rearward-most portion of the quantization coefficient if the number of currently quantized bits from said mean square error calculating and tolerance distortion bound comparing step is larger than the allocated number of bits; and a remaining-bit-number controlling step for calculating and controlling a total number of bits (number of bits remaining) to be allocated to the rest of the blocks, upon completion of one block encoding.

11. In an image compression encoding method for dividing an original image signal into a predetermined number of blocks, performing a discrete cosine transform (DCT) operation with respect to the divided blocks and quantizing and variable-length-encoding the discrete cosine transformed coefficient in order to enhance compression efficiency by compressing said input image signal, the image compression method comprising:

a forward control process for calculating directionality of said divided block and increasing a removal rate of non-representative directional components' discrete cosine transformed coefficients to thereby perform a quantization by varying a scale factor for each discrete cosine transformed coefficient;

a differential distortion allowance controlling process for controlling the scale factor of said forward control process for the distortion domains by placing a differential distortion for each domain in a screen, the distortion using a human visual system considering a shape and position imperceptible to human vision; and a backward control process for eliminating the least significant bits of said quantization coefficients so as to be encoded into a predetermined bit rate within a predetermined tolerance distortion bound if an amount of quantized coefficients in said forward control process is larger than that of tolerance amount of bits, and varying said tolerance distortion if the domain to which said quantized coefficients belong is a distortion domain.

12. An image compression apparatus for bit-rate fixation comprising:

separating means for separating luminance and color difference signals from an input digital image signal and outputting them in preset-sized blocks having been divided into a preset number thereof;

detecting means for detecting activity of the luminance and color difference signals having being separated from said separating means, and classifying corresponding classes according to the detected activity;

transform means for outputting transform coefficients obtained by performing a discrete cosine transform operation for output data from said separating means on a block-by-block basis;

distortion domain setting means for differently setting a distortion domain having a large distortion therein in each screen respectively by preset screen periods, and controlling a sequence of blocks to be read by said separating means;

scale factor controlling mean for setting a scale factor corresponding to a means activity of an overall image in the separating means, and varying the scale factor if the block, read by said separating means, comes under the distortion domain set by said distortion domain setting means;

quantizing means for outputting the quantization coefficients by quantizing said transform coefficients in accordance with the quantization step-sizes determined by multiplying the quantization matrix by the scale factor output from said scale factor controlling means;

variable-length-encoding means for variable-length-encoding the quantization coefficients output from said quantizing means; and bit allocating means for controlling a number of bits of a quantized block output from said quantizing means on a block-by-block basis by a reference of the number of bits correspondingly allocated in accordance with the activity, and controlling a tolerance number of bits by varying a reference tolerance distortion bound for the blocks of distortion domain.

13. An image compression apparatus for bit-rate fixation as claimed in claim 12, wherein said bit allocating means controls the amount of the quantization bits to be equal throughout a preset number of screen units by repeatedly decreasing a number of bits to the tolerance number of bits of the distortion domains in a preset number screens.

14. An image compression apparatus for bit-rate fixation as claimed in claim 12, wherein said distortion domain setting means sets a distortion pattern of the distortion domain based on a shape and location imperceptible to the human visual system in a screen.

15. An image compression apparatus for bit-rate fixation as claimed in claim 14, wherein said distortion domain setting means comprises:

a block sequencer having a plurality of memories for storing the distortion patterns of a screen, and controlling a block reading sequence of said separating means according to the block positioning information having been stored in one of a plurality of memories, with priority being given to a normal domain; and a frame sequencer for recognizing an order of the frame of a currently input digital image signal in the distortion pattern frames, and accessing to said one of the memories in which a corresponding distortion pattern is stored.

16. An image compression apparatus for bit-rate fixation as claimed in claim 15, wherein said block sequencer outputs a control signal for varying a scale factor, and simultaneously outputs the control signal for varying a tolerance distortion bound to the bit allocating means if the block read by said separating means comes under the distortion domain.

17. An image compression apparatus for bit-rate fixation as claimed in claim 12, wherein said bit allocating means comprises:

a block-bit-number determiner for counting a number of bits of quantization coefficient output from said quantizing means, to be compared with an allocated number of bits set according to the activity for each block;

a tolerance distortion bound selector for selecting a reference tolerance distortion bound for a class detected at said detecting means and varying the reference tolerance distortion bound in accordance with the control signal, from block sequencer, informing that the block comes under the distortion domain;

a mean square error calculator and tolerance distortion bound comparator for calculating a mean square error of a number of currently input quantization bits if the number of currently quantized bits is larger than the allocated number of bits, to be compared with the tolerance distortion bound set by said tolerance distortion bound selector;

a coefficient eliminator for eliminating the number of bits from a rearward-most portion of the quantization coefficient if the bits of quantized coefficients is larger than the allocated number of bits; and a remaining-bit-number controller for calculating a total number of bits (number of bits remaining) to be allocated to the remainder of the blocks upon completion of one block encoding.

* * * * *